3,254,001
PROCESS FOR PRODUCING N-FORMYL
HYDROXYAMINO ACETIC ACID
Edward A. Kaczka, Union, and Eugene L. Dulaney, Summit, N.J., assignors to Merck & Co., Inc., Rahway, N.J., a corporation of New Jersey
No Drawing. Original application Apr. 29, 1960, Ser. No. 25,506, now Patent No. 3,202,700. Divided and this application Sept. 16, 1964, Ser. No. 397,000
14 Claims. (Cl. 195—29)

This application is a division of copending application Serial No. 25,506, filed April 29, 1960, now U.S. Patent No. 3,202,700.

This invention relates generally to new derivatives of acetic acid. More particularly, it relates to derivatives of hydroxyamino acetic acid. Still more specifically, it is concerned with N-formyl hydroxyamino acetic acid, and with salts and esters thereof. It relates further to methods of preparing such substances.

These new compounds, the provision of which is one of the objects of this invention, may be represented in the free acid form by the general formula:

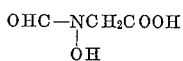

Also included within the invention are the salts and esters of N-formyl hydroxyamino acetic acid, so that the generic structural formula may be pictured as:

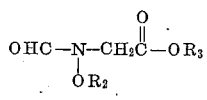

where $R_2$ may be hydrogen or a metal, and $R_3$ may be hydrogen, a metal, or a hydrocarbon group.

In addition to the free acids (where $R_2$ and $R_3$ are hydrogen), the alkali metal and alkaline earth metal salts, such as the sodium, potassium, lithium, calcium, and barium salts, and the lower alkyl esters exemplified by methyl, ethyl, propyl, and isopropyl esters, represent the preferred embodiments of $R_2$ and $R_3$. However, heavy metal salts and other esters such as the benzyl, phenethyl, allyl, and like esters may be produced according to the invention.

As will be discussed more fully below, the compounds of this invention are effective in inhibiting or preventing the growth of certain undesirable plants such as crab grass, dandelions, poison ivy, and other obnoxious weeds, and thus represent important and highly useful contributions to the agricultural field.

In accordance with the invention, it has been discovered that N-formyl hydroxyamino acetic acid may be produced in good yields by fermentation of a nutrient medium with a suitable microorganism. The organism employed for this purpose is a strain of Penicillium of the Monoverticallata or Asymmetrica conidial structure type, and preferably one classified as within the *Penicillium frequentans, Penicillium lividum, Penicillium janthinellum, Penicillium thomii, Penicillium implicatum, Penicillium camemberti* or *Penicillium expansum* series. For a diagrammatic key to the classification of Penicillia reference is made to the text "Manual of the Penicillia," by Raper and Thom, The Williams & Wilkins Co., 1949, pages 120–121. Microorganisms which are particularly satisfactory for production of N-formyl hydroxyamino acetic acid are strains of the *Penicillium frequentans* and *Penicillium purpurrescens* species of the *Penicillium frequentans* series, and of the *Penicillium aurantio-violaceum* species of the *Penicillium lividum* series.

In order to prepare N-formyl hydroxyamino acetic acid by this fermentation method, a producing strain of Penicillium of the type described above is grown under submerged aerated conditions in a nutrient medium containing an assimilable source of carbon and nitrogen. The particular nutrient medium is not critical. Suitable carbon sources include a carbohydrate such as dextrose, sucrose, starch, glycerol or molasses, whereas suitable sources of nitrogen include cornsteep liquor, yeast extract, soybean meal, cotton seed meal, casein, distillers' solubles and the like. The fermentation medium also contains trace amounts of salts which are normally contained in the carbon and nitrogen sources. The nutrient medium is normally adjusted to a pH in the range of 6–8, and sterilized before inoculation with the producing strain of Penicillium. Substantial quantities of N-formyl hydroxyamino acetic acid are normally produced in the fermentation medium after a growth period of approximately 4–10 days at temperatures in the range of 25°–30° C. With the preferred microorganism, about 2–15 grams of N-formyl hydroxyamino acetic acid per liter of fermentation broth is produced under these conditions.

In order to recover the N-formyl hydroxyamino acetic acid from the fermentation broth, the mycelia are first removed by techniques such as filtration or centrifugation. The filtered broth is concentrated essentially to dryness by techniques known in this art. The solid residue is then extracted with methanol and the methanol extracts, which contain the desired product, are concentrated to dryness or near dryness. Final purification is achieved by crystallization from aqueous ethanol. This method of recovering N-formyl hydroxyamino acetic acid may be employed to obtain either the free acid or an alkali metal salt thereof. Unless pH adjustments are made at conclusion of fermentation or during the isolation process, the product obtained will depend upon the pH of the finished fermentation broth. It is normally preferred to start the fermentation at a pH of 6–8.

If it is desired, N-formyl hydroxyamino acetic acid may be synthesized by bringing the producing enzyme system elaborated by the above-described microorganisms into intimate contact with an aqueous medium containing sources of carbon and nitrogen. With this procedure, it is not necessary or contemplated that a growing culture of the Penicillium be used.

N-formyl hydroxyamino acetic acid, and its salts and esters, exhibit absorption in the infra-red portion of the spectrum, give a red-purple color with ferric chloride, do not reduce Fehling's solution, decolorize permanganate, give a yellow colow with bromphenol blue and an atypical ninhydrin test. They may be hydrolyzed with acid to hydroxyamino acetic acid and formic acid.

It has been found convenient in the case of the N-formyl hydroxyamino acetic acid prepared by fermentation, to recover the product as an alkali metal salt such as the sodium salt. The salts have the activity of the parent acid and may be employed as such or converted to the acid by treatment with an aqueous mineral acid or by ion exchange resin metathesis. N-formyl hydroxamino acetic acid exists in two crystalline forms, cubes melting at 108°–110° C. and needles melting at 119°–120° C.

Salts of N-formyl hydroxyamino acetic acid are also readily obtained by treating a solution of acid with an appropriate base such as ammonium hydroxide, potassium hydroxide, sodium carbonate, calcium carbonate, lithium hydroxide, and the like. It will be realized that mono- and di-salts can be produced depending on the amount of base employed, the di-salts forming at a pH of about 10 and above.

Similarly, esters are synthesized by treatment of the N-formyl acid with a suitable esterfying agent such as a diazoalkane. In this manner, lower alkyl esters such as the methyl, ethyl, and propyl esters of N-formyl hydroxyamino acetic acid are obtained, which compounds possess the activity of the acid and salts discussed in more detail hereinbelow. Alternatively, esters may be obtained by transesterification of the methyl ester with an appropriate alcohol, or by esterification of hydroxyamino acetic acid and subsequent N-formylation of the ester. This latter method is convenient since the esterification may be acid catalyzed without risk of hydrolyzing the N-formyl group.

The monosodium salt of N-formyl hydroxyamino acetic acid, which is the species normally recovered from a fermentation broth, exists as a hydrate as well as in anhydrous form as shown by infra-red spectra determinations. The spectra can be divided into two categories: (a) those which show free hydroxyl absorption (band at $2.8\mu$) and (b) those in which this band is absent. The anhydrous material has characteristic infra-red absorption at the longer wavelengths which is readily distinguishable from the hydrate.

The characteristic peaks of absorption in the infra-red region of the spectrum of the two forms of sodium N-formyl hydroxyamino acetate, as well as the absorption peaks of N-formyl hydroxyamino acetic acid, and the ammonium, potassium, and calcium salts thereof, are at the following wavelengths in microns:[1]

Sodium N-formyl hydroxyamino acetate (anhydrous):
    $2.8$–$4.2\mu$ (broad), 5.9, 6.3, 6.6, 7.0, 7.6, 8.3, 8.4, 9.8, 10.1, 11.2, 13.0
Sodium N-formyl hydroxyamino acetate (hydrate):
    2.8–2.9, 3.7–4.2 (broad), 6.0, 6.3, 6.6. 7.5, 8.2, 10.1, 11.2, 12.8
Disodium N-formyl hydroxyamino acetate:
    2.9, 3.1, 6.1, 6.3, 7.6, 8.2, 8.3, 10.2, 10.4, 10.7, 11.0, 11.7–12.0, 12.8
N-formyl hydroxyamino acetic acid:
    2.8–4.5 (broad), 5.8, 6.1, 7.2, 7.5, 8.0, 8.2, 8.4, 10.2, 10.8, 11.1, 13.0
Ammonium N-formyl hydroxyamino acetate:
    3.1–5.0 (broad), 5.9–6.1, 6.3, 6.5, 7.7, 8.3, 10.2, 10.8, 11.3, 12.9
Potassium N-formyl hydroxyamino acetate:
    3.0–4.7 (broad), 6.0, 6.5, 7.6, 8.2, 8.4, 9.9, 10.2, 11.2, 13.0
Calcium N-formyl hydroxyamino acetate:
    3.1, 5.9, 6.1, 6.3, 7.2, 7.6, 8.3, 10.1, 10.7, 10.9

The compounds of this invention are highly effective in killing or inhibiting the growth of certain types of plants. They are particularly useful in that they kill or inhibit growth of weeds and other undesirable plants such as crab grass, dandelions, sheep sorrel, plantains and wild brush. The treatment is normally carried out by spraying a solution of the N-formyl hydroxyamino acetic acid (or salt or ester derivative thereof) on the plants, preferably to run-off. Effective results are obtained with small amounts of active ingredient, i.e. with solutions containing from 30–1000 p.p.m. of N-formyl hydroxyamino acetic acid.

In addition to using solutions of pure or substantially pure compounds for this purpose, highly satisfactory results are obtained with concentrates of the active materials. This is of particular significance in the case of N-formyl hydroxyamino acetic acid compounds because it permits the use of crude fermentation concentrates, and even of the fermentation broth itself, for control of weeds and other undesirable plants. The N-formyl hydroxyamino acetic acid described herein likewise inhibits the growth of Alaska pea plants, germinated tomato seeds and pinto bean plants. This property may be conveniently used as a means of determining the presence and concentration of our new compounds in a material, or as a method of standardizing preparations thereof.

The following examples are given for the purpose of illustration only and not by way of limitation.

[1] The spectra were taken on a Perkin-Elmer Model 137 Infra-red Spectrophotometer (Infracord) on a sample suspended in mineral oil (Nujol).

*Example 1*

A. A nutrient medium having the following composition is prepared:

| | Percent |
|---|---|
| Dextrose | 4.0 |
| Cornsteep liquor | 1.0 |
| Hydrolyzed lactalbumin (Edamin) | 2.0 |
| Distilled water | 93.0 |

400 ml. of this medium is added to a 2 liter Erlenmeyer baffled flask and the pH adjusted to 6.8 with 0.1 N sodium hydroxide. It is then sterilized in an autoclave at 15 pounds per square inch gauge pressure, at 121° C. for 17 minutes. The medium is then cooled to room temperature and inoculated with 50 ml. of a growing culture of *Penicillium purpurrescens* (NRRL No. 2819). The inoculated medium is incubated on a rotary shaker, operating at a speed of 120 r.p.m. for 7 days at a temperature of 28° C. At the end of this time, the fermentation broth is filtered through a Büchner filter funnel precoated with Super-Cel. The filtered fermentation broth containing N-formyl hydroxyamino acetic acid inhibits the growth of pinto bean plants, as evidenced by a significant reduction in width of the trifoliate leaflets of young pinto bean plants sprayed with the filtered broth as compared to the width of the leaflets of unsprayed plants.

B. When a filtered fermentation broth containing N-formyl hydroxyamino acetic acid and produced in the manner described above is sprayed to run-off on plots of crab grass, a substantially complete killing of the crab grass is effected over a period of 28 days after spraying. When lawn grasses are similiarly treated, the growth of such grasses is substantially stopped for a period of about 28 days but grass is not killed.

C. The inoculum for the fermentation described in Part A above is prepared in the following manner: A culture of *Penicillium purpurrescens* (NRRL No. 2819) is grown for 7 days at 28° C. on a slant medium composed of 1.0% dextrose, 0.5% hydrolyzed lactalbumin (Edamin), 1.0% yeast extract, 2.0% agar, and the remainder distilled water.

To this slant culture is added 10 ml. of the salt solution medium (described by Davis & Mingioli, J. Bact. 60, 17–28 (1950) without sugar) having the following composition:

| | Gms./liter |
|---|---|
| $K_2HPO_4$ | 7 |
| $KH_2PO_4$ | 3 |
| NaCitrate·$2H_2O$ | 0.5 |
| $MgSO_4$·$7H_2O$ | 1 |
| $(NH_4)_2SO_4$ | 1 |

5 ml. of the resulting spore suspension is added to 50 ml. of a sterilized medium containing 4.0% dextrose, 1.0% cornsteep liquor, 2.0% hydroylzed lactalbumin (Edamin), and the remainder distilled water. The pH of this medium is adjusted to 6.8 with sodium hydroxide prior to sterilization. This medium is incubated in a 250 ml. flask at 28° C. for 7 days, the incubation being carried out on a shaker operating at a speed of 220 r.p.m. This broth is employed for the inoculation of the fermentation described in Part A above.

*Example 2*

A nutrient medium having the following composition:

| | Percent |
|---|---|
| Dextrose | 4.0 |
| Cornsteep liquor | 1.0 |
| Hydrolyzed lactalbumin (Edamin) | 2.0 |
| Distilled water | 93.0 | is prepared and 400 ml. thereof added to each of 43 2 liter baffled Erlenmeyer flasks. The pH of the medium portions is then adjusted to 6.8 with a solution of 0.1 N sodium hydroxide, and each flask sterilized in an autoclave at 15 pounds per square inch gauge pressure at 121° C. for 17 minutes. After sterilization, the flasks are cooled to room temperature.

Each of the 43 flasks are inoculated with 50 ml. of a growing culture of Penicillium frequentans (NRRL No. 2818). The inoculum is prepared in the same manner described in Example 1(C). The inoculated media are incubated on a rotary shaker, the table of which is operating at 120 r.p.m. for a period of 7 days at a temperature of 28° C. The resulting broths are filtered through a Super-Cel coated Büchner filter funnel and the filtered fermentation broths are combined.

Three liters of the pooled fermentation broth thus obtained are lyophylized. The total yield of solids from this 3 liter portion is 245 g. These solids are triturated with one 1000 ml. and two 700 ml. portions of methanol. The insoluble material is separated by filtration and the methanol solutions combined and evaporated in vacuo to near dryness. This residue thus obtained is divided into two equal portions and treated as follows:

Portion A is washed with ethanol and the remaining solids dried. This material, which weighs about 20 g., is dissolved in 100 ml. of water and the aqueous solution diluted with 250 ml. of ethanol. Crystallization of the sodium salt of N-formyl hydroxyamino acetic acid begins almost immediately and is essentially complete after one hour. The salt is separated by filtration and air-dried; yield 10 g.

Portion B is dissolved in 100 ml. of water and ethanol added to the aqueous solution until crystallization of sodium N-formyl hydroxyamino acetate is complete. The yield of the air-dried salt is 10.8 g. Recrystallization of this material from aqueous ethanol gives substantially pure material, M.P. 205°–210° C. (dec.).

Anal.—Calc. for $C_3H_4NO_4Na$ (molecular weight 141.06): C, 25.54; H, 2.86; N, 9.93; Na, 16.3. Found: C, 25.50; H, 2.84; N, 9.91; Na, 16.7.

Example 3

A. One g. of monosodium N-formyl hydroxyamino acetate is dissolved in 10 ml. of water and the solution passed through a column containing ca. 27 ml. of a cation exchange resin of the nuclear sulfonic acid type (Amberlite IR–120) on the hydrogen cycle. The resin is washed with 10 ml. of water and the effluent and wash combined. The total volume is about 20 ml. This is lyophilized and the resulting solids triturated with acetone. The acetone solution is evaporated to dryness in vacuo and the solid thus obtained is triturated with ethanol. The ethanol solution is evaporated to dryness in vacuo. The resulting crystalline residue consisting of N-formyl hydroxyamino acetic acid is further purified by recrystallization from acetone-petroleum ether (30°–60° C.). The crystalline (needle-like) N-formyl hydroxyamino acetic acid obtained melts at 119°–120° C.

Anal.—Calc. for $C_3H_5NO_4$ (molecular weight 119.08): C, 30.26; H, 4.23; N, 11.76. Found: C, 30.88; H, 4.48; N, 12.21.

Potentiometric titration in water with 0.1 N LiOH shows two acidic functional groups: $pH^1$ 1/2 ca. 3.5, eq. wt. 123, and $pH^2$ 1/2 ca. 9.1, eq. wt. 111.

The acid and its salts have an Rf of 0.3–0.5 in a n-butanol:acetic acid:water (4:1:1 by volume) system on whatman No. 1 filter paper.

B. 269 mg. of monosodium N-formyl hydroxyamino acetate is dissolved in 2 ml. of water and the solution adjusted to ca. pH 1–2 with dilute hydrochloric acid. The solution is evaporated to near dryness in vacuo and the wet residue triturated with three 4 ml. portions of ethanol. The solutions are combined and evaporated to dryness in vacuo. The residue is dissolved in 5 ml. of ethanol and ca. 3 ml. of chloroform added to the solution. A small amount of white precipitate is separated and the clear solution evaporated to dryness in vacuo. The partially crystalline residue of N-formyl hydroxyamino acetic acid is dissolved in ca. 4 ml. of ethanol and the solution diluted with 35 ml. of chloroform. This solution is evaporated to dryness in vacuo to give cube-like crystals of N-formyl hydroxyamino acetic acid, M.P. 108°–110° C.

Example 4

Five g. of sodium N-formyl hydroxyamino acetate is dissolved in 20 ml. of water and the resulting solution passed through a column containing 200 ml. of Amberlite IR–120 resin on the hydrogen cycle. When the sodium salt solution has been put over the resin, the resin is then washed with 50 ml. of water and this wash combined with the column effluent. The volume of the resulting solution is about 65 ml. This solution is divided into three portions of 21 ml. each.

One portion is treated with concentrated aqueous ammonium hydroxide to a pH of 8 and the basic solution evaporated to dryness under reduced pressure. The residual monoammonium salt of N-formyl hydroxyamino acetic acid is purified by dissolving in 5 ml. of water and inducing crystallization by addition of 50 ml. of ethanol to the aqueous solution.

The second 21 ml. portion obtained above is treated to a pH of 7–8 with dilute aqueous potassium hydroxide. This solution is then concentrated to dryness and the residue dissolved in 5 ml. of water. Addition of 35 ml. of ethanol to the aqueous solution results in crystallization of the monopotassium salt of N-formyl hydroxyamino acetic acid.

The third portion is treated with excess calcium carbonate. After evolution of carbon dioxide is complete, the excess solid calcium carbonate is removed by centrifugation and the clear solution thus obtained concentrated to near dryness. The crystalline material which forms is the calcium salt of N-formyl hydroxyamino acetic acid which is only slightly soluble in water.

Example 5

0.5 mg. of N-formyl hydroxyamino acetic acid is dissolved in about 0.5 ml. of dilute aqueous sodium hydroxide. Dilution of the resulting solution with ethanol causes crystallization of the di-sodium solution. Di-sodium N-formyl hydroxyamino acetate may also be obtained from the monosodium salt by adjusting the pH of a solution containing the monosalt to about 11–12 with dilute sodium hydroxide. Upon addition of ethanol to this strongly basic solution, the di-sodium salt crystallizes and may be purified by recrystallization from aqueous ethanol.

Potentiometric titration of the di-sodium salt with 0.1 N hydrochloric acid gives two spans—$pH^1$ 1/2 ca. 8.7 and $pH^2$ 1/2 ca. 2.9.

The di-sodium salt of N-formyl hydroxyamino acetic acid obtained as described above may be converted, if desired, to the monosodium salt by treatment of an aqueous solution to a pH of 6–7 with a small amount of glacial acetic acid. The product is crystallized by dilution of the reaction mixture with ethanol.

Example 6

N-formyl hydroxyamino acetic acid is produced in substantial quantities when the process of Example 2 is carried out employing species of Penicillium other than the Penicillium frequentans (NRRL No. 2818) employed in that example. Species of Penicillium which are particularly useful in elaborating N-formyl hydroxyamino acetic acid are the following:

Penicillium spinulosum, NRRL 2827, Penicillium spinulosum, NRRL 2829, Penicillium frequentans, NRRL 1915, of the Penicillium frequentans series.

Penicillium trzebinskii, NRRL 732, Penicillium aurantio-violaceum, NRRL 762, Penicillium lividum, NRRL 754, of the Penicillium lividum series.

*Penicillium implicatum,* NRRL 723, of the *Penicillium implicatum* series.

*Penicillium turbatum,* NRRL 758, of the *Penicillium thomii* series.

*Penicillium janthinellum,* NRRL 2828, of the *Penicillium janthinellum* series.

*Penicillium caseicolum,* NRRL 876, of the *Penicillium camemberti* series.

*Penicillium crustosum,* NRRL 967, of the *Penicillium expansum* series.

*Example 7*

To an ethereal solution of about 2.5 g. of N-formyl hydroxyamino acetic acid, an ethereal solution of 1 g. of diazomethane is added dropwise with stirring. The reaction is carried out at room temperature. When addition is complete, the ether is removed in vacuo and the residue dissolved in acetone. Crystalline methyl N-formyl hydroxyamino acetate is obtained by diluting the solution with petroleum ether (30°–60° C.). The ester melts at 71°–72° C.

The infra-red absorption spectrum of a substantially pure sample of methyl N-formyl hydroxyamino acetate suspended in mineral oil (Nujol) taken on a Perkin-Elmer Model 137 Infrared Spectrophotometer (Infracord) shows characteristic peaks at the following wavelengths, expressed in microns: 5.75, 6.0, 7.9, 8.25, 8.45, 9.8, 9.95, 10.35, 11.15, 12.95, 13.3–13.8 (broad), 14.5.

*Example 8*

A. The activity of sodium N-formyl hydroxyamino acetate in controlling crab grass may be demonstrated by spraying a solution thereof on carb grass grown in greenhouses. In one experiment, pots containing 30–40 crab grass plants were sprayed to run-off with aqueous solutions containing 1000, 2000, and 4000 parts per million of sodium N-formyl hydroxyamino acetate. The solutions contained 0.1% of Tween 20 as a wetting agent. Eighteen days after spraying, the percent kill of crab grass was:

| Parts per million: | Percent kill |
|---|---|
| 4000 | 99 |
| 2000 | 80 |
| 1000 | 40 |

Similar results are obtained when the free acid or other alkali and alkaline earth metal salts are used instead of the monosodium salt.

B. A fermentation broth containing N-formyl hydroxyamino acetic acid is produced by fermenting the nutrient medium described in Example 1 above with *Penicillium purpurrescens* NRRL 2819 by the procedure of Example 1. On completion of the fermentation, the solid material is removed by filtering and the filtered broth sprayed to run-off on two separate plots of crab grass and on an established lawn plot in which there were five different lawn grasses: Highland Bent, New Zealand fescue, Fancy Red Top, Kentucky Blue, and Merion Blue. The following table illustrates the effects of spraying the strained fermentation broth on the three plots 28 days after spraying:

Crab grass: 6–9 cm. tall _____ 100% killed.
Crab grass: 15–20 cm. tall ____ 95% killed.
Lawn grass _____ Growth stopped; grass not killed.

N-formyl hydroxyamino acetic acid, and its salts and esters, are also highly effective in killing sheep sorrel, plantain, dandelions, clover, poison ivy, smart weed and ditch bank weed when aqeuous solutions thereof are sprayed to run-off on the palnts. Aqueous solutions of the pure substances or of concentrates such as fermentation solids, or filtered fermentation broths themselves may be employed.

*Example 9*

The following procedure is used to determine the effectiveness of the compounds of the invention in inhibiting growth of pinto bean plants:

Two seeds of pinto bean (*Phaseolus vulgaris* L.) are planted 1 inch deep in a 3½ inch water proof paper pot containing a mixture of 50% sandy loam soil and 50% Michigan hyper humus. After the pot is maintained with normal watering at a temperature of 28°–38° C. at a 65% relative humidity in the presence of natural sunlight for one week, the less developed plant is removed from the pot and discarded. The soil of the pot is then fertilized with an aqueous nutrient solution containing calcium nitrate (8.1 g./l.), potassium nitrate (2.5 g./l.), potassium dihydrogen phosphate (0.63 g./l.), and magnesium sulfate (1.2 g./l.). Three days later, when the primary leaves of the remaining plant are about two-thirds of their full size and when the trifoliate leaves are just starting to expand, the entire plant, including both sides of the leaves, is sprayed to run-off with the test solution. A second pot, started at the same time and treated the same way, except that the bean plant is not sprayed, is used as a control. The test plant and the control plant are maintained with normal watering at 28° C. and 65% relative humidity in the presence of natural sunlight. Four days later the width of each leaflet of the trifoliate leaves of the test plant and of the control plant are measured. Four plants are used for each sample and four plants for the control.

A. In an experiment using aqueous solutions containing varying concentrations of sodium N-formyl hydroxyamino acetic acid the following results were obtained:

| Parts per million of monosodium salt: | Width of leaflets, mm. |
|---|---|
| 0 | 27.5 |
| 62 | 23.3 |
| 125 | 17.6 |
| 250 | 6.8 |
| 500 | 3.6 |
| 1000 | 0.7 |

B. Three liters of whole broth produced by fermentation of a nutrient medium with *Penicillium purpurrescens* (NRRL No. 2819) in a manner similar to that described in Example 1 is acidified to a pH of 4 with acetic acid. The acidified broth is filtered and 1600 ml. of the clear filtrate freeze-dried. Two aqueous solutions containing respectively 10 mg./ml. and 20 mg./ml. of the freeze-dried solids were tested for inhibition of pinto bean plant growth by the above procedure. The solution containing 20 mg./ml. of the freeze-dried solids gave a 92% reduction in width of the trifoliate leaflets as compared with an untreated control plant, and the solution having 10 mg./ml. of the freeze-dried solids gave a 69% reduction under the same conditions.

Any departure from the above description which conforms to the present invention is intended to be included within the scope of the claims.

What is claimed is:

1. The process for producing N-formyl hydroxyamino acetic acid which comprises aerobically cultivating a strain selected from the group consisting of *Penicillium frequentans, Penicillium purpurrescens, Penicillium aurantio-violaceum, Penicillium trzebinskii, Penicillium spinulosum, Penicillium lividum, Penicillium janthinellum, Penicillium turbatum, Penicillium caseicolum, Penicillium crustosum,* and *Penicillium implicatum* in a culture medium comprising assimilable sources of carbon and nitrogen until a significant amount of N-formyl hydroxyamino acetic acid is produced.

2. The process for producing N-formyl hydroxyamino acetic acid which comprises aerobically cultivating a strain of *Penicillium frequentans* in a culture medium comprising assimilable sources of carbon and nitrogen until a significant amount of N-formyl hydroxyamino acetic acid is produced.

3. The process for preparing an N-formyl hydroxyamino acetate compound selected from the group consisting of N-formyl hydroxyamino acetic acid and salts thereof which comprises aerobically cultivating an N-formyl hydroxyamino acetic acid producing strain of a Penicillium possessing a conidial structure of a type selected from the group consisting of Monoverticillata and Asymmetrica in a culture medium comprising assimilable sources of carbon and nitrogen and in the presence of an inorganic salt forming cation, until a significant amount of said N-formyl hydroxyamino acetate compound is obtained in said medium, and recovering said compound.

4. The process according to claim 3 wherein the strain is a strain selected from the group consisting of *Penicillium frequentans, Penicillium purpurrescens, Penicillium aurantio-violaceum, Penicillium trzebinskii, Penicillium spinulosum, Penicillium lividum, Penicillium janthinellum, Penicillium turbatum, Penicillum caseicolum, Penicillium crustosum,* and *Penicillium implicatum.*

5. The process according to claim 3 wherein the inorganic cation is an alkali metal cation.

6. The process according to claim 5 wherein the strain is a strain of the species *Penicillim frequentans.*

7. The process according to claim 5 wherein the strain is a strain of the species *Penicillium aurantioviolaceum.*

8. The process according to claim 5 wherein the assimilable carbon source is a carbohydrate selected from the group consisting of dextrose, sucrose, starch, glycerol, and molasses, and the nitrogen source is selected from the group consisting of cornsteep liquor, yeast extract, soybean meal, cotton seed meal, casein, and distillers solubles.

9. The process according to claim 8 wherein the alkali metal cation is sodium.

10. The process according to claim 8 wherein the strain is a strain selected from the group consisting of *Penicillium frequentans, Penicillium purpurrescens, Penicillium aurantio-violaceum, Penicillium trzebinskii, Penicillium spinulosum, Penicillium lividum, Penicillium janthinellum, turbatum, Penicillium caseicolum, Penicillium crustosum,* and *Penicillium implicatum.*

11. The process according to claim 10 wherein the inorganic cation is an alkali metal cation.

12. The process according to claim 11 wherein the microorganism is a strain corresponding to *Penicillium purpurrescens* (NRRL No. 2819).

13. The process according to claim 11 wherein the microorganism is a strain corresponding to *Penicillium aurantio-violaceum* (NRRL No. 762).

14. The process according to claim 11 wherein the microorganism is a strain corresponding to *Penicillium frequentans* (NRRL No. 1915).

References Cited by the Examiner

Curtis, Plant Physiology, Vol. 32, No. 1, January 1957, pp. 56–59. Photocopy 195–36.

A. LOUIS MONACELL, *Primary Examiner.*